(12) United States Patent
Tang et al.

(10) Patent No.: US 9,163,928 B2
(45) Date of Patent: Oct. 20, 2015

(54) REDUCING REGISTRATION ERROR OF FRONT AND BACK WAFER SURFACES UTILIZING A SEE-THROUGH CALIBRATION WAFER

(71) Applicant: KLA-Tencor Corporation, Milpitas, CA (US)

(72) Inventors: Shouhong Tang, Santa Clara, CA (US); Chunhai Wang, Pleasanton, CA (US); Andrew An Zeng, Fremont, CA (US)

(73) Assignee: KLA-Tencor Corporation, Milpitas, CA (US)

(*) Notice: Subject to any disclaimer, the term of this patent is extended or adjusted under 35 U.S.C. 154(b) by 19 days.

(21) Appl. No.: 13/864,701

(22) Filed: Apr. 17, 2013

(65) Prior Publication Data
US 2014/0313516 A1  Oct. 23, 2014

(51) Int. Cl.
| | |
|---|---|
| *G01B 11/02* | (2006.01) |
| *G01B 9/02* | (2006.01) |
| *G01B 11/06* | (2006.01) |
| *G01B 11/24* | (2006.01) |

(52) U.S. Cl.
CPC ........ *G01B 9/02072* (2013.04); *G01B 9/02021* (2013.01); *G01B 9/02027* (2013.01); *G01B 11/06* (2013.01); *G01B 11/2441* (2013.01)

(58) Field of Classification Search
CPC ........... G01B 11/0675; G01B 11/2441; G01B 9/02027
USPC .......................... 356/498, 503, 511–514, 519
See application file for complete search history.

(56) References Cited

U.S. PATENT DOCUMENTS

| | | | |
|---|---|---|---|
| 5,754,294 A * | 5/1998 | Jones et al. | 356/503 |
| 6,032,512 A * | 3/2000 | Li | 73/1.79 |
| 6,847,458 B2 | 1/2005 | Freischlad et al. | |
| 7,876,438 B2 * | 1/2011 | Ghinovker et al. | 356/388 |
| 2002/0080366 A1* | 6/2002 | Nakayama | 356/512 |
| 2006/0139656 A1* | 6/2006 | Kulawiec et al. | 356/512 |
| 2010/0208272 A1* | 8/2010 | Tang et al. | 356/503 |

* cited by examiner

*Primary Examiner* — Tri Ton
*Assistant Examiner* — Willie Merrell, II
(74) *Attorney, Agent, or Firm* — Suiter Swantz pc llo

(57) ABSTRACT

A calibration wafer and a method for calibrating an interferometer system are disclosed. The calibration method includes: determining locations of the holes defined in the calibration wafer based on two opposite intensity frame; comparing the locations of the holes against the locations measured utilizing an external measurement device; adjusting a first optical magnification or a second optical magnification at least partially based on the comparison result; defining a distortion map for each of the first and second intensity frames based on the comparison of the locations of the holes; generating an extended distortion map for each of the first and second intensity frames by map fitting the distortion map; and utilizing the extended distortion map for each of the first and second intensity frames to reduce at least one of: a registration error or an optical distortion in a subsequent measurement process.

18 Claims, 3 Drawing Sheets

REDUCING REGISTRATION ERROR OF FRONT AND BACK WAFER SURFACES UTILIZING A SEE-THROUGH CALIBRATION WAFER

TECHNICAL FIELD

The disclosure generally relates to the field of measuring technology, particularly to methods for wafer shape and thickness measurement.

BACKGROUND

Thin polished plates such as silicon wafers and the like are a very important part of modern technology. A wafer, for instance, refers to a thin slice of semiconductor material used in the fabrication of integrated circuits and other devices. Other examples of thin polished plates may include magnetic disc substrates, gauge blocks and the like. While the technique described here refers mainly to wafers, it is to be understood that the technique also is applicable to other types of polished plates as well.

SUMMARY

The present disclosure is directed to a method for calibrating an interferometer system. The interferometer system includes a cavity formed between reference flats in a first interferometer channel and a second interferometer channel. The calibration method includes: placing a calibration wafer in the cavity, the calibration wafer defining a plurality of holes therein; acquiring a first intensity frame from the first interferometer channel; acquiring a second intensity frame from the second interferometer channel; determining locations of the plurality of holes based on the first intensity frame; determining locations of the plurality of holes based on the second intensity frame; calculating a first distance between a pair of holes of the plurality of holes based on the first intensity frame; calculating a second distance between the same pair of holes based on the second intensity frame; comparing the first calculated distance and the second calculated distance against a measured distance between the same pair of holes; adjusting at least one of: a first optical magnification of the first interferometer channel or a second optical magnification of the second interferometer channel based on the comparison result; defining a distortion map for each of the first and second intensity frames based on said comparison of the locations of the plurality of holes; generating an extended distortion map for each of the first and second intensity frames by map fitting the distortion map; and utilizing the extended distortion map for each of the first and second intensity frames to reduce at least one of: a registration error or an optical distortion in a subsequent measurement process.

A further embodiment of the present disclosure is directed to an interferometer system. The interferometer system includes: first and second spaced apart reference flats having corresponding first and second parallel reference surfaces forming a cavity therebetween; first and second interferometer devices located on diametrically opposite sides of the cavity; first and second interferogram detectors; and one or more processing unit coupled to receive the outputs of the first and second interferogram detectors. The processing unit is configured for performing a method for calibrating the interferometer system based on first and second intensity frames of a calibration wafer obtained from the first and second interferogram detectors. The calibration method includes: determining locations of the plurality of holes based on the first intensity frame; determining locations of the plurality of holes based on the second intensity frame; comparing the locations of the plurality of holes determined based on the first intensity frame and the locations of the plurality of holes determined based on the second intensity frame against the locations of the plurality of holes measured utilizing an external measurement device; adjusting at least one of: a first optical magnification of the first interferometer channel or a second optical magnification of the second interferometer channel at least partially based on the comparison; defining a distortion map for each of the first and second intensity frames based on the comparison of the locations of the plurality of holes; generating an extended distortion map for each of the first and second intensity frames by map fitting the distortion map; and utilizing the extended distortion map for each of the first and second intensity frames to reduce at least one of: a registration error or an optical distortion in a subsequent measurement process.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Generally, certain requirements may be established for the flatness and thickness uniformity of the wafers. There exist a variety of techniques to address the measurement of shape and thickness variation of wafers. One such technique is disclosed in U.S. Pat. No. 6,847,458, which is capable of measuring the surface height on both sides and thickness variation of a wafer. It combines two phase-shifting Fizeau interferometers to simultaneously obtain two single-sided distance map between each side of a wafer and corresponding reference flats, and computes thickness variation and shape of the wafer from the data and calibrated distance map between two reference flats.

The measurement directly obtained from a Fizeau interferometer is a wafer surface height map relative to the reference flat. Two of such maps, one from each channel, are combined to compute the thickness variation and the shape of a wafer. The registration accuracy of these two maps or the front side and the backside of a wafer play a very important role in the measurement. The method currently implemented uses the wafer boundary extracted on the oversized cavity area from both channels to register the front and the back side of wafer surfaces. Such registration may be inaccurate both in the rotational direction since the wafer is a circular shape and the notch is very small, and in the x-y direction since the wafer center is determined by the wafer edge that may be misplaced by the optical geometric distortion. Any registration error will prevent measurement accuracy from meeting stringent demands of future industry requirements.

The present disclosure is directed to a method to improve the accuracy of a wafer measurement system by reducing the registration error or the location mismatch of the front and the back of the wafer surfaces. In addition, a calibration process may be utilized to reduce the optical geometric distortion and/or match of the optical magnification of the Fizeau interferometers used in the measurement system.

Figure 1:
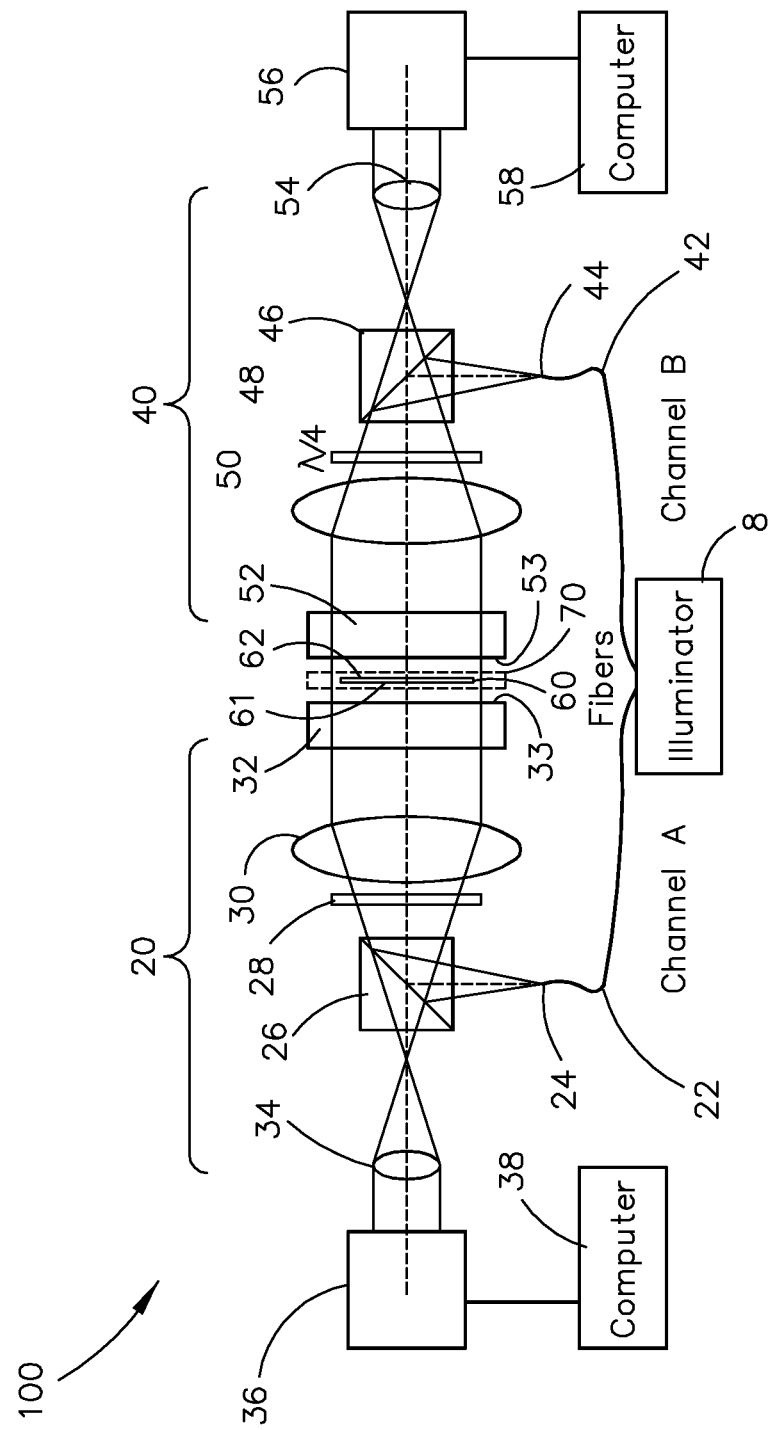
FIG. 1 is a diagrammatic representation of an interferometer system for measuring shape and thickness variation of a wafer.

Referring to FIG. 1, a block diagram depicting the measurement system 100 that utilizes two Fizeau interferometers is shown. As depicted in FIG. 1, the measurement system 100 is configured for measuring the shape and thickness of a wafer 60. The wafer 60 may be placed in a cavity in the center between two Fizeau interferometers 20 and 40. The reference flats 32 and 52 of the interferometers are placed close to the wafer 60.

The measurement system 100 provides two light sources for Channel A and Channel B through fiber 22 and fiber 42 from a single illuminator 8 that generates a constant power output during its wavelength tuning. In one embodiment, the light source 24,44 provides light that passes through a quarter-wave plate 28,48 aligned at 45° to the polarization direction of light after it is reflected from the polarizing beam splitter 26,46. This beam then propagates to the lens 30,50, where it is collimated with a beam diameter larger than the wafer diameter.

The beam then goes through transmission flat 32,52, where the central part of the transmitted beam is reflected at the test surface 61,62 that forms an interferogram with the light beam reflected from the reference surface 33,53. The outer part of the transmitted beam travels on to the opposite reference flat 52,32, where it is reflected at the reference surface 53,33 that forms an annular shape interferogram with the light beam reflected from the reference surface 33,53. An interferogram detectors (e.g., an imaging device such as a camera or the like) 36,56 is utilized to record the interferograms and send the interferograms to a computer 38,58 for processing to produce the desired information such as the shape and the thickness variation of a wafer.

Figure 2:
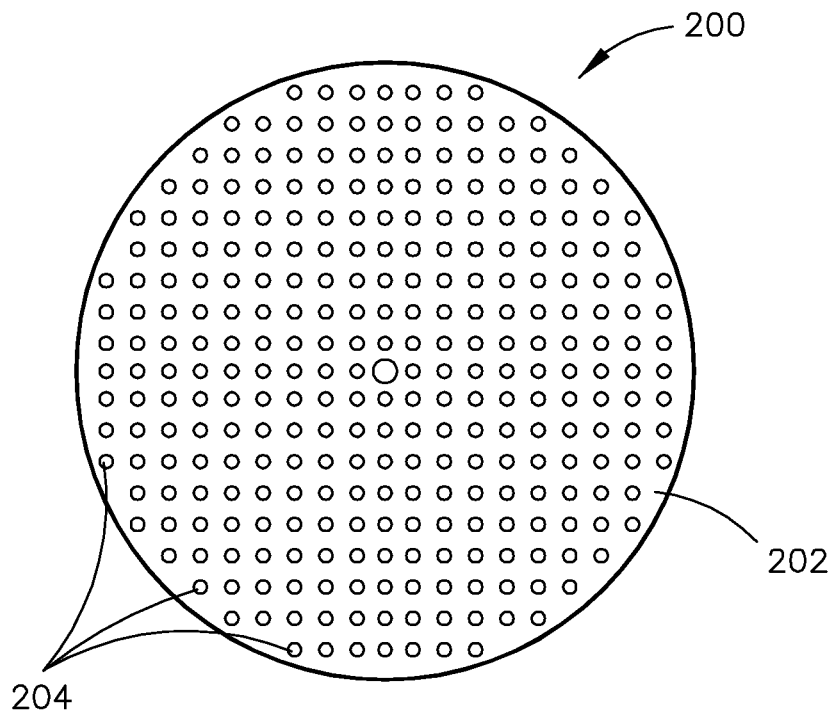
FIG. 2 is an illustration depicting a calibration wafer.

In accordance with one embodiment of the present disclosure, a see-through calibration wafer 200 as depicted in FIG. 2 is utilized to calibrate the wafer measurement system. More specifically, the see-through calibration wafer (or simply referred to as the calibration wafer) 200 is an opaque wafer 202 with holes 204 defined therein. The calibration wafer 200 may be inserted into the cavity formed by the reference flat 32 and 52 as depicted in FIG. 1 for calibration purposes. The holes 204 defined in this manner provide reference locations that can be compared to improve the accuracy of the wafer measurement system.

For instance, one of the main advantages of using such a calibration wafer 200 is that the holes 204 can be seen from both Channel A and Channel B at the same time. Thus the relative position of each hole on two interferogram detectors can be obtained directly with high accuracy. This is crucial for computing the wafer thickness since any relative position shift between the surface from Channel A and the surface from Channel B results in large thickness calculation errors and needs to be mitigated. Another advantage of using the calibration wafer 200 is that the center positions of the holes 204 (which are used as reference points) can be determined much more accurately than just the camera pixel resolution. Thus any small optical geometric distortion can be determined more accurately using such reference points than using camera pixel resolution itself.

Figure 3:
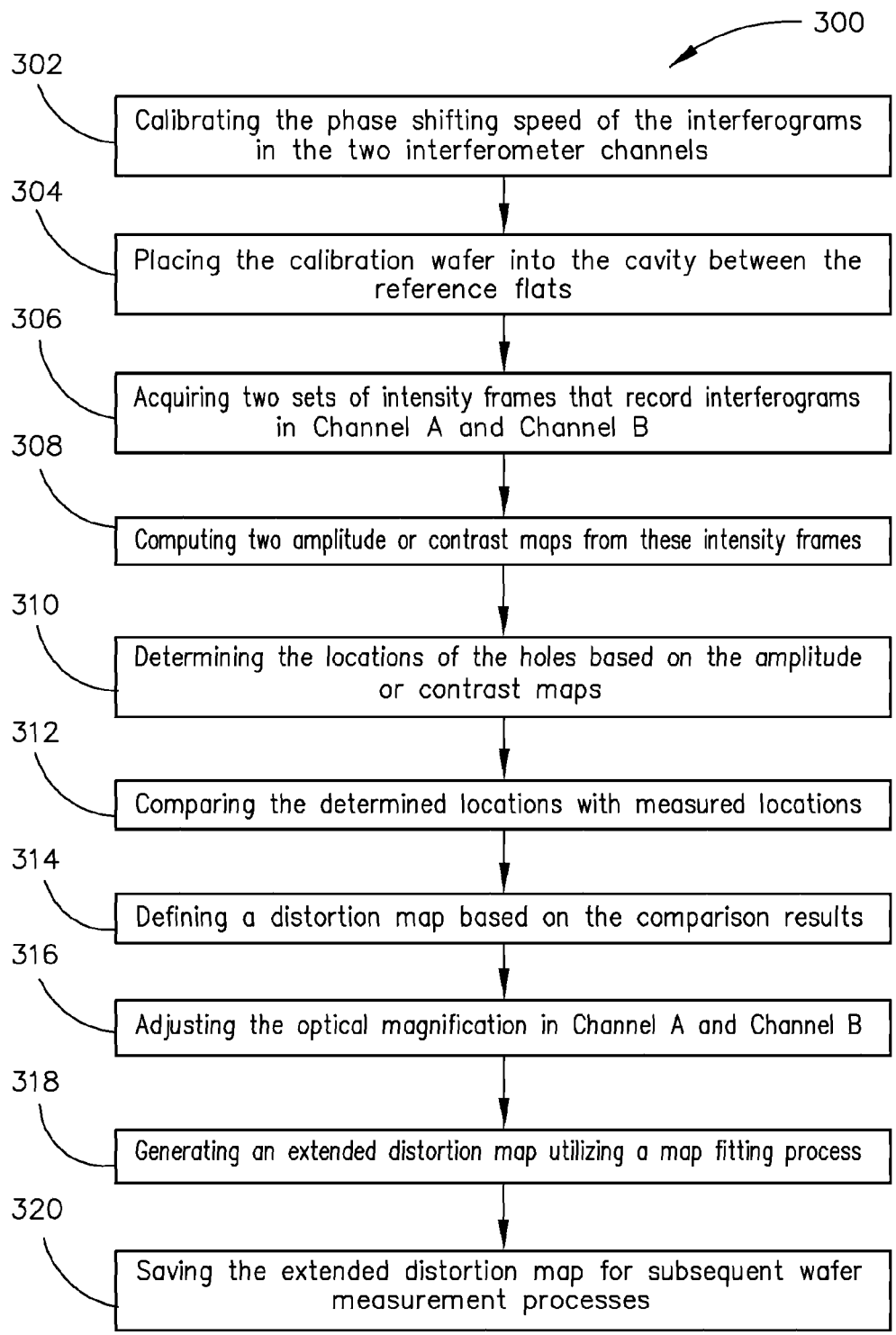
FIG. 3 is a flow diagram illustrating a method for calibrating the interferometer system utilizing a calibration wafer.

Referring to FIG. 3, a method 300 for improving measurement accuracy of the wafer thickness variation by reducing the registration error of the front and back surfaces is shown. Step 302 first calibrates the phase shifting speed of the interferograms in the two interferometer channels. In one embodiment, the phase shifting speed of the interferograms are calibrated by placing a polished opaque plate in the cavity between the reference flats 32 and 52. Alternatively, the phase shifting speed calibration may be conducted by the cavity itself (without the polished opaque plate). Upon completion of the phase shift calibration, or when the phase shift between any adjacent frames is within ±1 degree or less of its expected value such as 90 degrees for the phase shift between any adjacent frames, the method may proceed to step 304.

In step 304, the calibration wafer as described above is placed into the cavity between the reference flats 32 and 52. Step 306 then acquires two sets of intensity frames that record interferograms in Channel A and Channel B by varying the wavelength of the light source. Two amplitude or contrast maps from these intensity frames may then be computed in step 308, one map for each channel, and these amplitude/contrast maps may be used in step 310 to determine the locations of the circles (e.g., circle centers) that correspond to the holes defined in the calibration wafer.

It is contemplated that the precise center locations of the holes defined in the calibration wafer may be known/measured using an external mechanical and/or optical measurement device/equipment prior to the placement of the calibration wafer into the cavity. Such center location information may therefore be utilized as reference values and the center locations of the circles determined in step 310 may be compared against these reference values in step 312. Performing such comparisons help the calibration process to determine the distortions that may exist, and step 314 may subsequently define a distortion map based on the comparison results.

In one embodiment, the distortion map is defined in pixel coordinates of the intensity frame. The distortion map contains information regarding the relative rotations and center locations of the holes between the measurements taken in step 310 and the reference values. Such information may then be used during the conversion from the pixel coordinates to wafer coordinates.

For instance, step 316 may adjust the optical magnification (um/pixel) in Channel A and Channel B such that the physical distance between any given two circles/holes calculated in Channel A is the same as that calculated in Channel B. More specifically, after the optical system in each channel is setup, the optical system itself is fixed but the optical magnification value M in each channel may be adjusted. The value of the optical magnification $M_A$ (in Channel A) or $M_B$ (in Channel B) can be adjusted such that the distance $d_A$ or $d_B$ of any two circle hole centers computed from each channel is the same to their true physical distance $d_p$ on the calibration wafer. That is, for a pair of holes defined in the calibration wafer, given $d_A=P_A \times M_A$ and $d_B=P_B \times M_B$, where $P_A$ and $P_B$ are the pixels measured in Channel A and Channel B, respectively, ideally the equation $d_A=d_B=d_p$ should be true. Therefore, step 316 may compare the calculated distance $d_A$ and $d_B$ against the measured distance $d_p$ for the same pair of holes and adjust the optical magnification in Channel A and/or Channel B so that the equation $d_A=d_B=d_p$ is satisfied.

It is contemplated that the two holes selected for performing this operation may be predetermined or chosen arbitrarily. Additionally and/or alternatively, step 316 may be carried out multiple times using different pair of holes each time. However, due to the measurement errors and optical distortions, $d_A=d_B=d_p$ may not be satisfied for the distances calculated from all pairs of holes at the same time. Therefore, if step 316 is carried out for multiple pairs, the values of $M_A$ and $M_B$ should be defined such that the overall error is minimized. It is contemplated that the particular holes selected for performing the adjustment, and the number of times such adjustments are performed, may various without departing from the spirit and scope of the present disclosure.

One advantage of using the calibration wafer to providing and adjust the optical magnification in Channel A and Channel B as described above is to allow the rest of the wafer measurement process to be performed based on the physical wafer locations as opposed to the camera pixel locations. In addition, another advantage of using the calibration wafer is that it can be used to calibrate the optical distortions as well. That is, using the calibration wafer in accordance with the present disclosure, the center positions of the holes can be determined much more accurately than the wafer boundary extracted on the oversized cavity area from both channels to register the front and the back side of wafer surfaces. This allows optical geometric distortions to be determined more accurately.

More specifically, the locations of the holes determined based on the intensity frame obtained in Channel A and the locations of the holes determined based on the intensity frame obtained in Channel B are compared against the actual (measured) locations of the these holes in step 312 to obtain the distortion information. Once the distortion information regarding these discrete points defined by the holes in the calibration wafer is determined, the distortion information/map can be extended to every pixel in the field of view of Channel A and Channel B. In one embodiment, map fitting techniques, such as least square fitting processes, may be used in step 318 to extend the distortion map. For instance, two distortion maps (e.g., using two dimensional fitting) may be defined for each of Channel A and Channel B. For each channel, one distortion map may be generated to describe the distortion in x direction and the other distortion map may be generated to describe the distortion in y direction. The extended distortion maps may then be saved in step 320 for future references.

It is contemplated that the extended distortion maps may be utilized to reduce registration errors or location mismatches, providing improved registration for the front and the back side of wafer surfaces during wafer measurement. While existing wafer measurement methods use wafer boundary locations and notch locations to match the relative position of surfaces from Channel A and Channel B (i.e., the front and the back side of wafer surfaces), such registrations may be inaccurate both in the rotational direction since the wafer is a circular shape and the notch is very small, and in the x-y direction since the wafer center is determined by the wafer edge that may be misplaced by the optical geometric distortion. It is contemplated that geometric distortions can be determined more accurately using the extended distortion maps in accordance with the present disclosure. That is, the same measurement procedures may be performed except that the distortion maps generated in accordance with the present disclosure are used to reduce registration errors and location mismatches of the front and back surfaces.

Accordingly, once the measurement system is calibrated as described in method 300, the wafer 60 that is to be measured may be placed in the cavity. The wafer 60 may be placed in between the two Fizeau interferometers 20 and 40 (more specifically, between the reference flats 32 and 52). A holding container may be utilized to removably secure the wafer 60 when the wafer 60 is placed in the cavity. The holding container may be configured in a manner such that both wafer sides 61 and 62 are minimally obscured by the holding container.

Subsequently, two sets of intensity frames that record interferograms in Channel A and Channel B with different phase shifts by varying the wavelength of the light source 8 may be acquired. The phases and phase shifts of interferograms from these intensity frames may be extracted and the shape and thickness information may be computed based on the phases and phase shifts of interferograms extracted. In one embodiment, the shape and thickness information may be computed in a manner similar to that disclosed in U.S. Pat. No. 6,847,458. For instance, let A denote the phase of interferogram formed by reference flat 32 and wafer surface 61, let B denote the phase of interferogram formed by the reference flat 53 and wafer surface 62, and let C denote the phase of interferogram formed by the cavity of two reference flats 32 and 53. Thus A provides information regarding the height of the wafer surface 61, B provides information regarding the height of the wafer surface 62, and C−(A+B) provides information regarding the thickness variation of the wafer 60.

Figure 4:
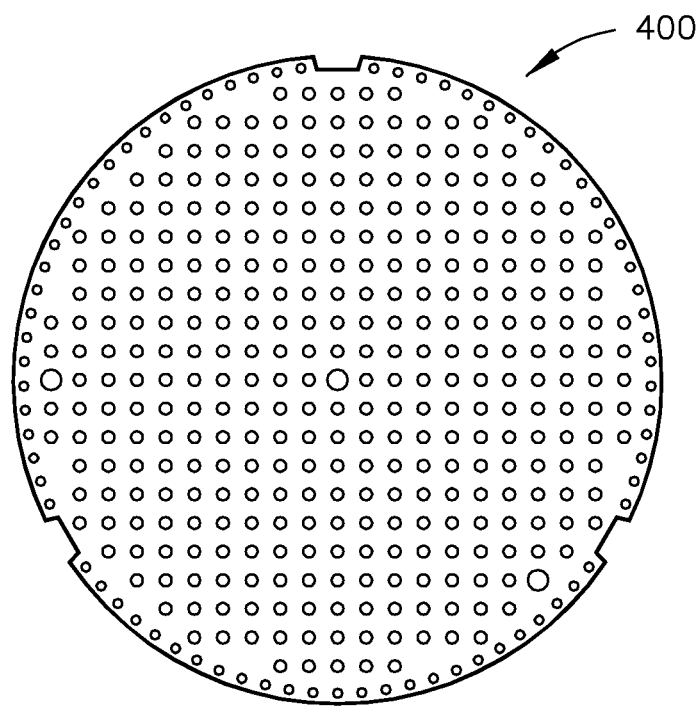
FIG. 4 is an illustration depicting another calibration wafer.

It is contemplated that the calibration wafer 200 depicted in FIG. 2 is merely exemplary. For instance, FIG. 4 shows a calibration wafer 400 having an extended edge (greater than the wafer diameter) with holes defined therein. The purpose of using an extended calibration wafer 400 is to put holes as close as possible to the measuring wafer edge position in order to minimize the distortion map at the wafer edge location. In other words, the holes defined in the calibration wafer are spread over an area that is as large as possible. It is also contemplated, however, that the holes defined on the calibration wafers are not required to form any particular patterns. That is, holes may be randomly distributed or scattered/spread over the entire calibration wafer. Furthermore, the size and the shape of holes can vary without departing from the spirit and scope of the present disclosure.

It is also contemplated that while steps 306 and 308 described above compute amplitude or contrast maps from interferograms obtained in Channel A and Channel B to determine the center locations of the holes defined in the calibration wafer, various other techniques may be utilized without departing from the spirit and scope of the present disclosure. For instance, a video frame without the cavity interferogram may be acquired by swiping the laser wavelength, and step 310 may determine the center/edge locations of the holes directly from the video frame.

It is contemplated that the calibration method in accordance with the present disclosure not only helps calibrating/adjusting the optical magnification of the interferometers used in the measurement system, but also improves the registration accuracy. In accordance with the present disclosure, matching the relative positions of surfaces from Channel A and Channel B is not based on wafer boundary locations and notch locations, but is explicitly calibrated using the calibration wafer to provide precise registration information for Channel A and Channel B, therefore improving the measurement accuracy of the measurement system.

It is contemplated that while the examples above referred to wafer metrology measurements, the systems and methods in accordance with the present disclosure are applicable to other types of polished plates as well without departing from the spirit and scope of the present disclosure. The term wafer used in the present disclosure may include a thin slice of semiconductor material used in the fabrication of integrated circuits and other devices, as well as other thin polished plates such as magnetic disc substrates, gauge blocks and the like.

It is to be understood that the present disclosure may be implemented in forms of a software/firmware package. Such a package may be a computer program product which employs a computer-readable storage medium/device including stored computer code which is used to program a computer to perform the disclosed function and process of the present disclosure. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

The methods disclosed may be implemented as sets of instructions, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

It is believed that the system and method of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory.

What is claimed is:

1. A method for calibrating an interferometer system, the interferometer system including a cavity formed between reference flats in a first interferometer channel and a second interferometer channel, said first interferometer channel and said second interferometer channel located on diametrically opposite sides of the cavity, the method comprising:
   placing a calibration wafer in the cavity, the calibration wafer defining a plurality of holes therein;
   acquiring a first intensity frame from the first interferometer channel;
   acquiring a second intensity frame from the second interferometer channel;
   determining locations of the plurality of holes based on the first intensity frame;
   determining locations of the plurality of holes based on the second intensity frame;
   calculating a first distance between a pair of holes of the plurality of holes based on the first intensity frame;
   calculating a second distance between the same pair of holes based on the second intensity frame;
   comparing the first calculated distance relative to the second calculated distance; and
   adjusting at least one of: a first optical magnification of the first interferometer channel and a second optical magnification of the second interferometer channel based on said comparison of the first calculated distance relative to the second calculated distance to reduce a difference between the first calculated distance and the second calculated distance.

2. The method of claim 1, wherein the distance between a pair of holes is determined by a center-to-center distance.

3. The method of claim 1, wherein said at least one of: the first optical magnification and the second optical magnification is adjusted such that the distance between the pair of holes calculated based on the first intensity frame utilizing the first optical magnification is equal to the distance between the pair of holes calculated based on the second intensity frame utilizing the second optical magnification.

4. The method of claim 1, wherein the pair of holes utilized for calculating the first distance and the second distance is a first pair of holes, the method further comprising:
   calculating a third distance between a second pair of holes of the plurality of holes based on the first intensity frame;
   calculating a fourth distance between the second pair of holes based on the second intensity frame;
   comparing the third calculated distance relative to the fourth calculated distance; and
   adjusting at least one of: the first optical magnification of the first interferometer channel and the second optical magnification of the second interferometer channel based on comparisons of the first calculated distance relative to the second calculated distance for the first pair of holes and the third calculated distance relative to the fourth calculated distance for the second pair of holes to reduce an overall difference between the first calculated distance relative to the second calculated distance and between the third calculated distance relative to the fourth calculated distance.

5. A method for calibrating an interferometer system, the interferometer system including a cavity formed between reference flats in a first interferometer channel and a second interferometer channel, said first interferometer channel and said second interferometer channel located on diametrically opposite sides of the cavity, the method comprising:
   placing a calibration wafer in the cavity, the calibration wafer defining a plurality of holes therein;
   acquiring a first intensity frame from the first interferometer channel;
   acquiring a second intensity frame from the second interferometer channel;
   determining locations of the plurality of holes based on the first intensity frame;
   determining locations of the plurality of holes based on the second intensity frame;
   calculating a first distance between a pair of holes of the plurality of holes based on the first intensity frame;
   calculating a second distance between the same pair of holes based on the second intensity frame;
   comparing the first calculated distance relative to the second calculated distance;
   adjusting at least one of: a first optical magnification of the first interferometer channel and a second optical magnification of the second interferometer channel at least partially based on said comparison of the first calculated distance relative to the second calculated distance to reduce a difference between the first calculated distance and the second calculated distance;
   defining a distortion map for each of the first and second intensity frames based on a comparison of the locations of the plurality of holes;
   generating an extended distortion map for each of the first and second intensity frames by map fitting the distortion map; and
   utilizing the extended distortion map for each of the first and second intensity frames to reduce at least one of: a location mismatch of a front and a back of a wafer surface and an optical distortion in a subsequent measurement process.

6. The method of claim 5, wherein the comparison of the locations of the plurality of holes includes a comparison of the locations of the plurality of holes determined based on the first intensity frame and the locations of the plurality of holes determined based on the second intensity frame against the locations of the plurality of holes measured utilizing an external measurement device.

7. The method of claim 5, wherein a diameter of the calibration wafer is configured to be greater than a diameter of a largest wafer that the interferometer system is configured to measure, wherein the area of the calibration wafer beyond the area of the largest wafer that the interferometer system is configured to measure is defined as an extended edge, and wherein a plurality of holes are defined within the extended edge of the calibration wafer for a wafer edge calibration.

8. The method of claim 5, wherein said at least one of: the first optical magnification or the second optical magnification is adjusted such that the distance between the pair of holes calculated based on the first intensity frame utilizing the first optical magnification is equal to the distance between the pair of holes calculated based on the second intensity frame utilizing the second optical magnification.

9. The method of claim 5, wherein the pair of holes utilized for calculating the first distance and the second distance is a first pair of holes, the method further comprising:
calculating a third distance between a second pair of holes of the plurality of holes based on the first intensity frame;
calculating a fourth distance between the second pair of holes based on the second intensity frame;
comparing the third calculated distance relative to the fourth calculated distance; and
adjusting at least one of: the first optical magnification of the first interferometer channel and the second optical magnification of the second interferometer channel based on comparisons of the first calculated distance relative to the second calculated distance for the first pair of holes and the third calculated distance relative to the fourth calculated distance for the second pair of holes to reduce an overall difference between the first calculated distance relative to the second calculated distance and between the third calculated distance relative to the fourth calculated distance.

10. The method of claim 5, wherein the distortion map for each of the first and second intensity frames includes distortion information describing the distortion in x direction and in y direction.

11. The method of claim 5, wherein the extended distortion map for each of the first and second intensity frames is generated utilizing a least square fitting process.

12. The method of claim 5, wherein the extended distortion map for each of the first and second intensity frames is configured for providing distortion information for an entirety of a field of view of the first and second intensity frames, respectively.

13. An interferometer system, comprising:
first and second spaced apart reference fiats having corresponding first and second parallel reference surfaces forming a cavity therebetween;
first and second interferometer devices located on diametrically opposite sides of the cavity;
first and second interferogram detectors; and
at least one processing unit coupled to receive the outputs of the first and second interferogram detectors, the at least one processing unit configured for performing a calibration of the interferometer system based on first and second intensity frames of a calibration wafer, the calibration wafer defining a plurality of holes therein, obtained from the first and second interferogram detectors, said calibration of the interferometer system comprising:
determining locations of the plurality of holes based on the first intensity frame;
determining locations of the plurality of holes based on the second intensity frame;
calculating a first distance between a pair of holes of the plurality of holes based on the first intensity frame;
calculating a second distance between the same pair of holes based on the second intensity frame;
comparing the first calculated distance relative to the second calculated distance; and
adjusting at least one of: a first optical magnification of the first interferometer channel and a second optical magnification of the second interferometer channel at least partially based on said comparison of the first calculated distance relative to the second calculated distance to reduce a difference between the first calculated distance and the second calculated distance such that the distance between any two holes in the first interferometer channel is the same as the distance between any two holes in the second interferometer channel.

14. The interferometer system of claim 13, wherein said calibration of the interferometer system further comprises:
defining a distortion map for each of the first and second intensity frames based on a comparison of the locations of the plurality of holes;
generating an extended distortion map for each of the first and second intensity frames by map fitting the distortion map; and
utilizing the extended distortion map for each of the first and second intensity frames to reduce at least one of: a location mismatch of a front and a back of a wafer surface and an optical distortion in a subsequent measurement process.

15. The interferometer system of claim 13, wherein said at least one of: the first optical magnification and the second optical magnification is adjusted such that the distance between the pair of holes calculated based on the first intensity frame utilizing the first optical magnification is equal to the distance between the pair of holes calculated based on the second intensity frame utilizing the second optical magnification.

16. The interferometer system of claim 13, wherein the pair of holes utilized for calculating the first distance and the second distance is a first pair of holes, and wherein said calibration of the interferometer system further comprising:
calculating a third distance between a second pair of holes of the plurality of holes based on the first intensity frame;
calculating a fourth distance between the second pair of holes based on the second intensity frame;
comparing the third calculated distance relative to the fourth calculated distance; and
adjusting at least one of: the first optical magnification of the first interferometer channel and the second optical magnification of the second interferometer channel based on comparisons of the first calculated distance relative to the second calculated distance for the first pair of holes and the third calculated distance relative to the fourth calculated distance for the second pair of holes to reduce an overall difference between the first calculated distance relative to the second calculated distance and between the third calculated distance relative to the fourth calculated distance wherein an overall error is minimized.

17. The interferometer system of claim 14, wherein the distortion map for each of the first and second intensity frames includes distortion information describing the distortion in x direction and in y direction.

18. The interferometer system of claim 14, wherein the extended distortion map for each of the first and second intensity frames is configured for providing distortion information for an entirety of a field of view of the first and second intensity frames, respectively.

* * * * *